Feb. 15, 1949.  W. D. THOMPSON  2,461,668
FILM HOLDER FOR PHOTOGRAPHIC ENLARGERS
Filed Oct. 24, 1946  2 Sheets-Sheet 2
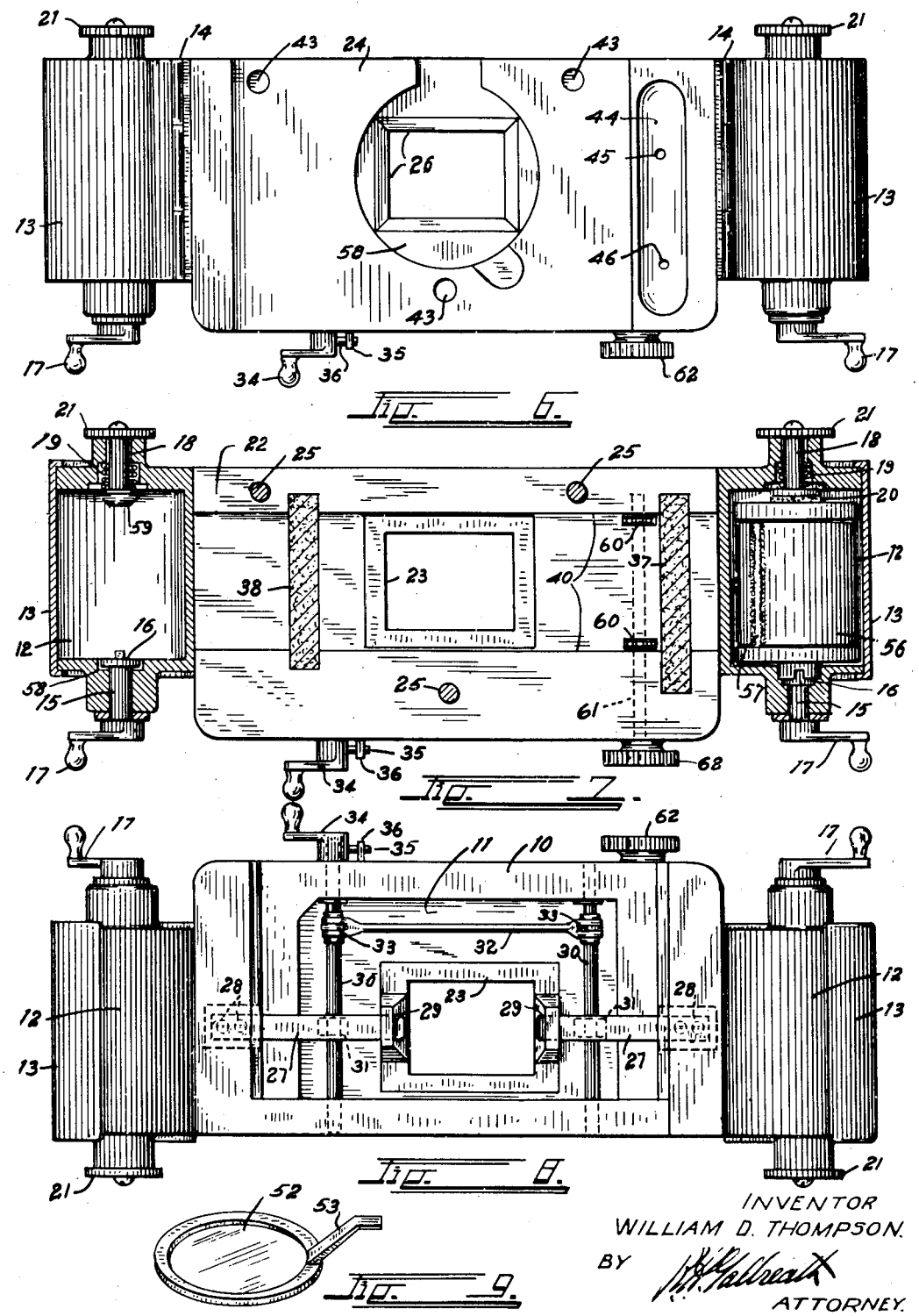
INVENTOR
WILLIAM D. THOMPSON.
BY
ATTORNEY.

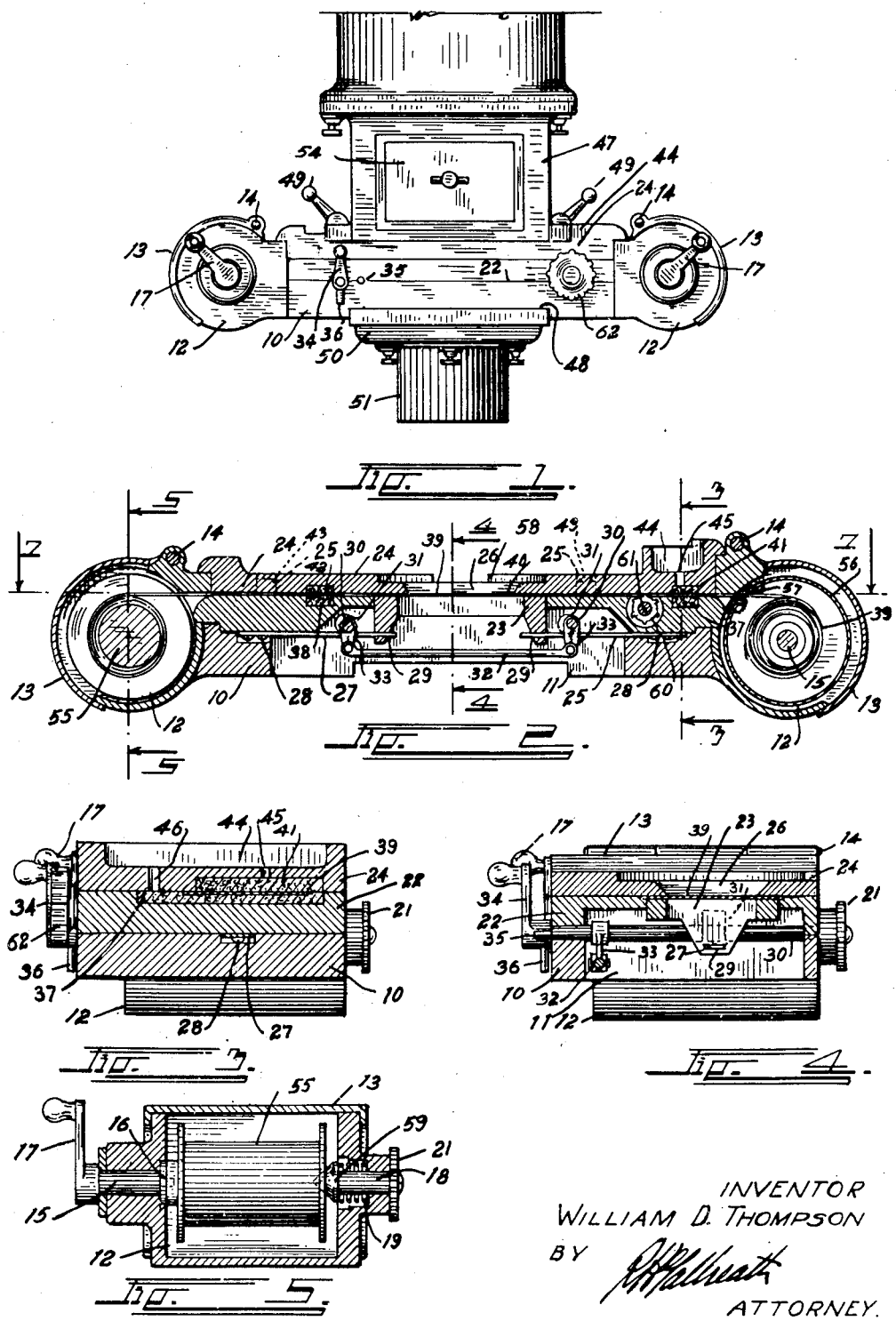

Patented Feb. 15, 1949

2,461,668

UNITED STATES PATENT OFFICE 2,461,668

FILM HOLDER FOR PHOTOGRAPHIC ENLARGERS

William D. Thompson, San Diego, Calif.

Application October 24, 1946, Serial No. 705,443

3 Claims. (Cl. 88—24)

This invention relates to a negative holder for photographic enlarging devices. One of the greatest causes of trouble in a photographic enlarger is occasioned by finger prints, minute particles of dust, and other deposits upon the negatives which, when enlarged, cause objectional blemishes on the enlargement.

The principal object of this invention it to provide a negative holder which will eliminate this cause of trouble by providing a dust-proof container for the film; by providing efficiency operating means for cleaning and wiping each section of the negative film immediately before it enters the enlarging area; and by providing convenient, dust-proof storage for the film.

Another object is to provide means in a film holder for holding the film accurately and snugly at the exact focal plane during the enlarging step, and to so construct this means that it can be quickly and easily released from the film during the travel thereof so as to avoid scratching or otherwise marring the film.

A still further object of the invention is to so construct the film holder that it may be used for holding unexposed film should it be desired to use the enlarging machine as a camera.

The improved film holder may be used in any suitable enlarging apparatus. It is, however, more particularly designed for use with the enlarging machine described and illustrated in applicant's copending application, Serial No. 705,441, now abandoned and in substituted Application No. 1,947.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of drawing and throughout the description.

In the drawing:

Fig. 1 is a side view of the improved negative holder illustrating it in place in a conventional enlarging apparatus;

Fig. 2 is a longitudinal section through the holder, taken on the line 2—2, Fig. 6;

Figs. 3, 4 and 5 are cross-sections through the holder taken on the lines 3—3, 4—4, and 5—5, respectively, Fig. 2;

Fig. 6 is a plan view of the improved holder;

Fig. 7 is a horizontal section therethrough, taken on line 7—7, Fig. 2;

Fig. 8 is a bottom view of the holder; and

Fig. 9 is a detail perspective view of a diffusing glass employed with the improved holder.

In the description, portions of a photographic enlarger of the type illustrated in applicant's said copending application are indicated on the drawing and designated by numeral as follows: focusing chamber 47; film holder slot 48; film holder clamps 49; lens head 50; and objective lens barrel 51.

The improved negative carrier or film holder comprises a frame member 10 having a rectangular apparatus opening 11 at its mid-portion and terminating in two semi-circular film receivers 12 at its extremities. Each of the film receivers 12 is sealed by means of an arcuate lid 13, each of which is mounted on a hinge pin 14 adjacent its receiver 12. The hinge lids 13 open upwardly so that the film rolls may be conveniently dropped into the receivers by gravity.

A crank shaft 15 is axially mounted in the outer extremity of each film receiver 12. The shafts 15 are provided with spool-engaging buttons 16 for engaging the extremities of conventional film spools 55. The shafts 15 are each rotatable by means of a winding crank 17.

The spools are clamped against the spool-engaging buttons 16 by means of pressure shafts 18 positioned at the opposite extremity of each film receiver. The pressure shafts are urged inwardly by means of compression springs 19. One of the shafts 18 terminates in a felt button 20 designed to engage the extremity of a film containing can 56. The other shaft 18 terminates in a centering cone 59 for engaging the extremity of the film spool 55. The shafts 18 can be withdrawn outwardly to release the film spool 55 or can 56 by means of knurled heads 21.

The film being enlarged, indicated at 39, is led from the spool 55 in one of the receivers 12 to the can 56 in the other receiver through a film channel 40 extending across the face of a film carrier plate 22. The carrier plate rests upon the frame member 10 between the containers 12 and is provided with a rectangular opening for positioning a rectangular pressure plate 23 beneath the film.

A cover plate 24 is removably positioned on the carrier plate 22 and is accurately located thereon by means of dowel pins 25 which enter receiving dowel openings in the bottom of the cover plate. The cover plate 24 is provided with a framing opening 26 which frames the selected negative exposure on the film.

The pressure plate 23 is also provided with a framing opening of larger size than the opening 26, and the latter plate acts to force and hold the film tightly against the back of the cover plate 24 around the framing opening 26.

This is accomplished by means of two leaf springs 25, 27, there being one spring at each side of the pressure plate 23. The springs 27 are secured to the carrier plate by means of suitable screws 28 at their one extremity and extend through receiving slots 29 in the pressure plate 23 at their other extremity. The action of these springs is to constantly urge the pressure plate against the emulsion side of the film and to clamp the latter snugly against the cover plate 24.

The action of the springs is so restraining that the film cannot be moved without damage unless the pressure plate is pulled away or lifted from the film. The latter is accomplished by means of two horizontal, parallel cam shafts 30 rotatably mounted in the frame member 10, there being one cam shaft extending across each of the springs 27.

On each cam shaft immediately below the spring 27 an eccentric cam 31 is secured. The two cam shafts are tied together so as to rotate simultaneously by means of a connecting link 32 extending between link levers 33, there being one link lever secured on each shaft 30. One of the shafts 30 extends outwardly to one side of the carrier plate 22 and terminates in an operating lever 34.

The cams 31 are positioned at 90° from the levers 33 so that a 90° rotation of the lever 34 will cause the cams to contact the springs 27 to force them downwardly. In turn, these springs will pull the pressure plate 23 downwardly away from the film to release the latter for movement through the holder. A stop pin 35 and a stop lever 36 are provided to limit the arc of movement of the lever 34 to the fully clamped and fully released positions.

The emulsion side of the film is wiped clean as it passes through the holder by means of two felt pads 37 and 38. The pads 37 and 38 are indented into receiving depressions in the carrier plate 22 immediately below the path of the film 39. The film necessarily frictionally contacts these pads as it travels through the holder so that any dust or other foreign materials are wiped from the surface. The opposite side of the film is similarly wiped by means of two pads 41 and 42 of lintless felt or velvet which are indented upwardly into recesses in the bottom of the cover plate 24.

A reservoir 44 for film cleaning solution is formed in the cover plate 24 immediately over the pad 41 and communicates with the latter through a drain opening 45. A second drain opening 46 opens from the bottom of the reservoir to one side of the film channel 40 to the pad 37 so that both sides of the film are moistened with any suitable film cleaning fluid to remove finger prints and other foreign materials.

The cover plate 24 is provided with a circular indentation or recess 50 surrounding the framing opening 26. This recess is for the purpose of receiving a light-diffusing disc 52 of ground or opal glass. The disc is shown in detail in Fig. 9 and is provided with a suitable handle 53 by means of which it may be removed or inserted into the recess 52 through a removable door 54 in the focusing chamber 57.

The can 56 is light-tight and provided with a felt-sealed slot 57 through which the film may be withdrawn across the film holder. One extremity of the can contains an opening 58 through which the button 16 may engage a film spool within the can 56. The cans 56 are intended as storage containers for processed film of full rolls, or portions of full rolls that would be long enough to reach from can to take up spool 55. Individual negatives would be inserted and removed, as is done in conventional negative carriers, by removing the carrier from the enlarger, removing the cover plate 24 and laying the negative in the film channel 40 in the proper place to position it so that when the cover plate is replaced the pressure plate 23 will hold the negative in place. In this manner one negative at a time can be handled. In cases where negatives might have been cut into longer lengths, say of six or more exposures, and the film is still too short to thread through, as would be done on a full roll, toothed sprockets 60 are provided in the film channel. The sprockets 60 are mounted on a sprocket shaft 61 terminating in a knurled knob 62 on the front of the holder, to be used to transport such short lengths through the carrier.

In the case of a full roll the procedure would be as follows. A can 56, containing the film 15 inserted into the right hand container 12, the end of the film is laid in the film channel and extended into the other container 12 where it is attached to the take up spool 55. The cover plate 24 is then put in place, and the whole is inserted into the slot in the enlarger head, and locked. If it is desired to actually clean the film a small amount of film cleaner is put into the reservoir 44. The crank on the left compartment is rotated until all of the film had been transported to that compartment except for a suitable length of trailer firmly attached to the spool in can 56. In its travel, it is cleaned by passage between the first two pads 38 and 42. During the enlarging, the film is wound back into the original dust tight can for storage. At no time after the film has been developed and stored in these cans, is it ever necessary to remove it. Thus the film is preserved and protected at all times.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A film holder for enlarging machines comprising: a horizontally extending frame member provided with a medially positioned apparatus opening; a semi-cylindrical film receiver formed on each extremity of said frame member; a lid closing each receiver and allowing access thereto for placing a roll of film therein; means for rotating the rolls of film in said receivers, said film extending from one receiver to the other receiver above said frame member; a cover plate removably positioned above said frame member and provided with a framing opening; a first absorbent wiping pad supported from said frame member in contact with the bottom surface of said film; a second absorbent wiping pad carried by said cover plate in contact with the upper surface of said film; a fluid cleaner reservoir in said cover plate; and conduits communicating between said reservoir and said pads to supply cleaning fluid to the latter.

2. A film holder for enlarging machines comprising: a horizontally extending frame member provided with a medially positioned apparatus opening; a semi-cylindrical film receiver formed on each extremity of said frame member; a lid closing each receiver and allowing access thereto for placing a roll of film therein; means for rotating the rolls of film in said receivers; a carrier plate supported by said frame plate and adapted to support the film in its passage from one receiver to the other; a cover plate over said carrier plate; spring-actuated means supported in said carrier plate urging the film against the cover plate about a framing opening therein; a first wiping pad imbedded in said carrier plate below the path of said film; a second wiping pad imbedded in said cover plate above the path of said film; a fluid cleaner reservoir in said cover plate; a first conduit from said reservoir to said first pad; and a second conduit from said reservoir to the lower surface of said cover plate immediately over said second pad for supplying cleaner fluid to said pads.

3. In a film holder of the type adapted to support and guide a photographic negative across the light beam in an enlarging machine, means for cleaning said negative as it travels across said beam comprising: a first absorbent pad supported in contact with the lower surface of said negative; a second absorbent pad supported in contact with the upper surface of said negative; a reservoir for cleaning fluid supported above both pads; and conduits communicating between said reservoir and said pads supplying cleaning fluid to the latter.

WILLIAM D. THOMPSON.

REFERENCES CITED

The following references are of record in the file of this patent:

UNITED STATES PATENTS

| Number | Name | Date |
| --- | --- | --- |
| 1,208,664 | Russak | Dec. 12, 1916 |
| 1,219,712 | DeMoos | Mar. 20, 1917 |
| 2,174,660 | Hirsch | Oct. 3, 1939 |
| 2,251,077 | Stanton | July 29, 1941 |
| 2,266,908 | Rogers | Dec. 23, 1941 |
| 2,294,622 | Langberg | Sept. 1, 1942 |
| 2,351,371 | Smith | June 13, 1944 |
| 2,369,981 | Reyniers | Feb. 20, 1945 |